United States Patent [19]

Baldwin

[11] Patent Number: 4,583,702

[45] Date of Patent: Apr. 22, 1986

[54] LIGHTNING PROTECTION FOR AIRCRAFT RADOMES

[75] Inventor: Roger E. Baldwin, Abingdon, England

[73] Assignee: United Kingdom Atomic Energy Authority, London, England

[21] Appl. No.: 557,444

[22] Filed: Dec. 2, 1983

[30] Foreign Application Priority Data

Dec. 14, 1983 [GB] United Kingdom ................ 8235530

[51] Int. Cl.[4] ................................................ B64D 45/02

[52] U.S. Cl. .................................... 244/1 A; 361/117; 361/218; 244/121

[58] Field of Search ......................... 361/117, 218-220, 361/222, 216, 217, 212; 244/1 A, 121; 343/708

[56] References Cited

U.S. PATENT DOCUMENTS

| | | | |
|---|---|---|---|
| 3,416,027 | 12/1968 | Amason et al. | 244/1 A |
| 3,896,342 | 7/1975 | Pugef | 361/117 |
| 3,906,308 | 9/1975 | Amason et al. | 244/1 A |
| 3,989,984 | 11/1976 | Amason et al. | 361/117 |
| 4,237,514 | 12/1980 | Cline | 361/218 |

*Primary Examiner*—Galen L. Barefoot
*Attorney, Agent, or Firm*—William R. Hinds

[57] ABSTRACT

A conductive strip for attachment to an aircraft radome to provide protection against the effects of a lightning strike to the radome, wherein the conductive strip has a series of holes formed in it.

2 Claims, 3 Drawing Figures

LIGHTNING PROTECTION FOR AIRCRAFT RADOMES

Most aircraft are fitted with radar sets the aerials of which are covered by fairings known as radomes.

In order that the radar sets can operate efficiently, the radomes are made of dielectric material, and therefore to lightning they look transparent. Lightning strikes to unprotected radomes result in surface punctures and the formation of an arc to some electrically conducting member within the radomes. The usual result of the formation of such an arc is that a high pressure is generated which causes the radome concerned to disintegrate explosively.

One proposed solution to this problem is to provide a series of thin aluminium strips on the surface of the radome linking it to the main structure of the aircraft, the said strips being too thin to carry the currents generated by a lightning strike so that they are destroyed as a result of a lightning strike. Unfortunately, it has been found that when the strips are vapourised the localised energy released is sufficient to form a cut along the line of the aluminium strip, so that again the radome is destroyed.

According to the invention in one aspect there is provided a conductive strip for attachment to an aircraft radome to provide protection against the effects of a lightning strike to the radome, wherein the conductive strip has a series of holes formed in it.

According to the invention in another aspect, there is provided an aircraft radome having a plurality of conductive metal strips attached to its surface whereby the radome can be connected electrically to the main structure of an aircraft, wherein the metal strips have holes formed in them.

Preferably the holes are square or rectangular and are so dimensioned that the remaining metal areas are all of the same width.

Figure 1:
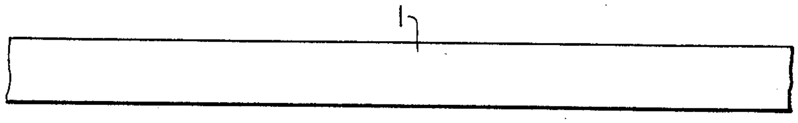
FIG. 1 (PRIOR ART)
Figure 2:
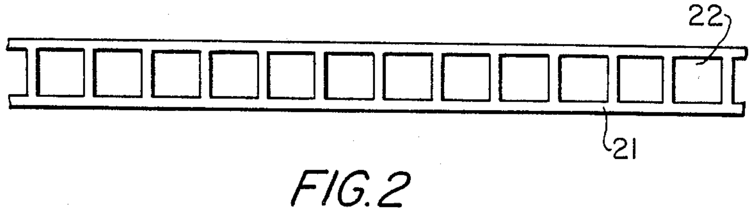

The invention will now be described, by way of example, with reference to the accompanying drawings, in which:

FIG. 1 is a representation of a previously proposed conductive strip for use in protecting aircraft radomes against damage resulting from lightning strikes; and FIG. 2 is a representation of an embodiment of the present invention.

Figure 3:
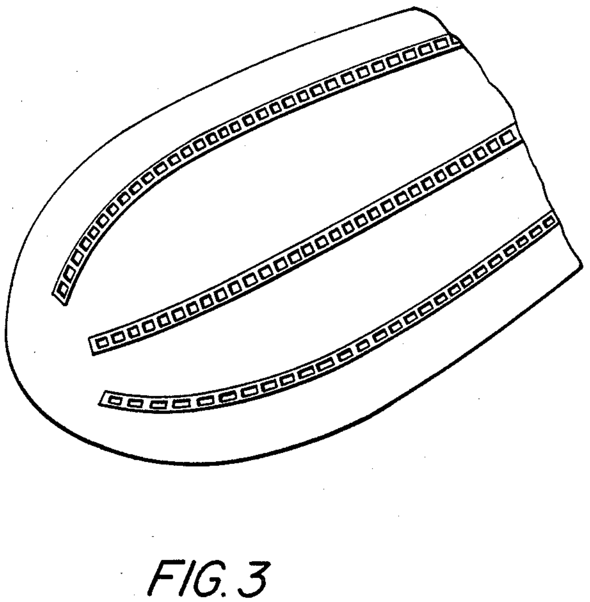

FIG. 3 schematically illustrates a typical aircraft radome with conductive strips mounted thereon.

Referring to the drawings, FIG. 1 shows a form of sacrificial metal strip 1 which it has been proposed should be used for the protection of aircraft radomes against the effects of lightning strikes. The strip 1 is made of aluminium and is about 1 cm wide and 0.25 mm thick. One side, 2, is coated with adhesive so that it will stick to the surface of a radome to which it may be applied.

Unfortunately, it has been found that when such strips are mounted on a typical radome and are subjected to simulated lightning strikes, the forces produced by the foil vapourising cause cuts in the radome, which in flight would lead to its disintegration.

The effect is even more marked if the strips are covered by a layer of paint.

FIG. 2 shows a sacrificial lightning protector strip embodying the invention, consisting of a strip of aluminium 21 again about 1 cm wide by 0.25 mm thick, but which has a series of holes 22 formed in it. The holes 22 are some 8 mm square, and are so positioned that the remaining metal of the strip 21 is of uniform width. The holes 22 could be rectangular in shape, the important thing is that the remaining metal is of uniform thickness so that no localised regions of considerably increased amounts of metal occur. A typical radome, which may be considered as known and conventional, is schematically shown in FIG. 3 with the sacrificial strips mounted thereon in a conventional manner.

The damage which results from the use of the earlier type of sacrificial strip is thought to arise because the pinch effect which occurs when the strip is carrying the current from a real or simulated lightning strike collapses the strip into a very sharply defined line. The subsequent sudden vaporisation of the fine conductor produces the cutting action.

In the case of the strip of the present invention however, firstly, the pinch effect does not occur in the same way, and also the dispersion of a smaller amount of metal over the same original area means that at any given position there is insufficient metal to cause a harmful amount of damage to a radome. This is still true even if the strip is painted over.

I claim:

1. An aircraft radome having a plurality of sacrificial conductive narrow metal strips attached to its surface whereby the radome can be connected electrically to the main structure of an aircraft, wherein the metal strips have holes formed in them positioned and dimensioned such that the remaining areas of metal are all of substantially the same width and there are substantially no localized regions of considerably increased amounts of metal, and such that at no position on a strip is there sufficient metal present to cause structural failure of the radome due to the vaporization of a region of the strip arising from a lightning strike on that region of the strip.

2. A radome according to claim 1 wherein the holes are square or rectangular.

* * * * *